(12) United States Patent
Kenyon (10) Patent No.: US 12,134,096 B2
(45) Date of Patent: Nov. 5, 2024

(54) APPARATUS AND METHOD FOR SORTING PARTICLES

(71) Applicant: APOGEE FLOW SYSTEMS LTD, Middlesex (GB)

(72) Inventor: Oliver Kenyon, Middlesex (GB)

(73) Assignee: APOGEE FLOW SYSTEMS LTD, Northwood (GB)

( * ) Notice: Subject to any disclaimer, the term of this patent is extended or adjusted under 35 U.S.C. 154(b) by 444 days.

(21) Appl. No.: 17/608,925

(22) PCT Filed: Jun. 12, 2020

(86) PCT No.: PCT/GB2020/051416
§ 371 (c)(1),
(2) Date: Nov. 4, 2021

(87) PCT Pub. No.: WO2020/249958
PCT Pub. Date: Dec. 17, 2020

(65) Prior Publication Data
US 2022/0234044 A1    Jul. 28, 2022

(30) Foreign Application Priority Data

Jun. 12, 2019 (GB) .................................. 1908419

(51) Int. Cl.
*B03C 5/02* (2006.01)
*B01L 3/00* (2006.01)

(52) U.S. Cl.
CPC ..... *B01L 3/502761* (2013.01); *B01L 3/50273* (2013.01); *B03C 5/026* (2013.01);
(Continued)

(58) Field of Classification Search
CPC ........... B01L 3/502761; B01L 3/50273; B01L 3/026; B01L 2200/0652; B01L 2400/0415;
(Continued)

(56) References Cited

U.S. PATENT DOCUMENTS 9,797,836 B1    10/2017  Sinclair et al.
2012/0103813 A1    5/2012  Sato et al.

OTHER PUBLICATIONS

Shang et al., "Microfluidic sorting of fluorescently activated cells depending on gene expression level," Electrophoresis 2013, 34, 3103-3110 (Year: 2013).*

(Continued)

*Primary Examiner* — Alexander S Noguerola
(74) *Attorney, Agent, or Firm* — Leber IP LAW; Celia H. Leber (57) ABSTRACT

The present invention relates to a method of sorting particles in a stream of carrier fluid, the method comprising: introducing a stream of carrier fluid containing a mixture of particles into a stream of sheath fluid flowing within a flow channel so as to focus the carrier fluid into a core stream; detecting a particle of interest within the core stream of carrier fluid at a point of detection within the flow channel; applying a potential difference between a first electrode and one or more additional electrodes so as to generate a divergent electric field localised around a tip of the first electrode, wherein the tip of the first electrode is positioned inside of the flow channel or adjacent to the flow channel in a position in which the divergent electric field is experienced by the sheath fluid and carrier fluid within the flow channel, and subsequently terminating application of the potential difference, wherein the potential difference is applied in response to the detection of a particle of interest, the applied potential difference being sufficient to generate a centripetal force on a volume of carrier fluid within the divergent (Continued)

electric field, said volume of carrier fluid containing the particle of interest, so as to displace said volume of carrier fluid in a direction having a component orthogonal to the direction of flow, such that the particle of interest is diverted into a desired outlet of the flow channel.

16 Claims, 3 Drawing Sheets

(52) U.S. Cl.
CPC ............... *B01L 2200/0652* (2013.01); *B01L 2400/0415* (2013.01)

(58) Field of Classification Search
CPC ........... G01N 27/447; G01N 27/44717; G01N 27/44721; G01N 27/44756; G01N 27/44791; G01N 27/453
See application file for complete search history.

(56) References Cited

OTHER PUBLICATIONS

Kim et al., "Microfluidic device to separate micro-beads with various fluorescence intensities," Sensors and Actuators B 160 (2011) 1536-1543 (Year: 2011).*
Mavrogiannis, Nicholas; et al., "Microfluidic Mixing and Analog On-Chip Concentration Control Using Fluidic Dielectrophoresis", Micromachines, vol. 7, No. 11, Nov. 23, 2016, 11pgs.
International Application No. PCT/GB2020/051416, International Search Report and Written Opinion mailed Oct. 7, 2020, 2 pages, 4 pages.

* cited by examiner

APPARATUS AND METHOD FOR SORTING PARTICLES

RELATED APPLICATIONS

This application is a national phase entry of International Patent Application No. PCT/GB2020/051416, filed Jun. 12, 2020, which claims priority from Great Britain Patent Application No. 1908419.3 filed Jun. 12, 2019.

BACKGROUND

Technical Field

The present invention relates generally to the field of particle sorting in flow systems, and in particular to a method and apparatus for sorting particles, such as biological cells, viruses, and extracellular vesicles, in a stream of carrier fluid by applying a dielectrophoretic force.

Discussion of Related Art

High-throughput and efficient sorting of particles is an important process in many biotechnological applications. Whilst a number of methods and devices for sorting cells within flow systems have been developed, flow cytometry and fluorescence activated cell sorting (FACS) are particularly well established technologies for counting and sorting particles as they flow through an optical detection system.

In such methods, a carrier fluid containing particles is focussed to a narrow stream by a sheath fluid, such that the particles pass one-by-one through an optical detection system, wherein particles of interest are identified on the basis of optical properties such as light scattering and/or fluorescence, which properties are representative of other characteristics of the particle, such as shape, size or composition. For example, in FACS, cells are labelled with fluorescent markers prior to analysis, which fluorescent markers may be then present in the particle in a quantity approximately proportional to a particular substance in the particle (for example the particle's DNA content). When a particle of interest is identified, a sort decision is made and the particle of interest is separated downstream of the optical detection system using an appropriate sorting method.

A sort decision is typically taken within tens of microseconds of the optical analysis, and separation of identified particles of interest is commonly performed by breaking the flow stream into droplets and charging each droplet an amount dependent on its optical properties. The charged droplets pass charged plates causing them to deflect into collection wells. Several methods have been developed utilising microfluidic devices to perform particle sorting in a stream of liquid without breaking the stream into droplets, however these are relatively slow and may suffer from excessive heat generation, which can damage particles of interest; typically biological particles.

Dielectrophoresis (DEP) is a phenomenon in which a force is exerted on a dipole when it is subjected to a non-uniform electric field. To prevent movement of charged particles, an AC electric field is often used. The DEP force does not require the particle to be charged. The utilization of the difference in dielectrophoretic forces exerted on different types of particle in non-uniform electric fields is known as DEP separation and this is commonly used to distinguish between particles.

DEP forces acting on individual cells or oil droplets in a carrier fluid have been exploited to achieve microfluidic cell sorting. All particles exhibit dielectrophoretic activity in the presence of electric fields. Where a particle carried through a flow cell in a carrier fluid is subjected to a non-uniform electric field, the difference in polarizability between the particle and the carrier fluid will generate a dielectrophoretic force on the particle, causing the particle to move through the carrier fluid towards a region of higher or lower electric field strength, depending on the polarizability of the particle relative to the carrier fluid. A particle which is more polarizable than the carrier fluid will move through the carrier fluid towards a region of high electric field strength and particle which is less polarizable than the carrier fluid will move through the carrier fluid towards a region of low electric field strength. In this manner, the particle can be diverted from its flow path to be sorted into a desired outlet of the flow cell by application of a non-uniform electric field.

However, traditional DEP sorting methods suffer from several drawbacks. Firstly, the DEP force acting on the particles is strongly dependent on the particles' electrical properties, shape, size and the electric field gradient, and thus the effectiveness of the technique is strongly dependent on the sample type being sorted. Accordingly, DEP particle sorting techniques have hitherto been unsuitable for many sample types. Secondly, particles moving through the carrier fluid under the DEP force are subjected to viscous drag, which slows the movement of particles through the carrier fluid. Accordingly, the speed at which particles can be separated by such methods is limited and thus the sort rates which can be obtained using such methods is also limited.

SUMMARY

It is an object of the present invention to provide an improved method and apparatus for sorting particles, in particular biological particles such as cells, viruses, and extracellular vesicles, in a stream of carrier fluid, within a sheath fluid, wherein particles can be sorted at high speed, without reliance on the dielectric properties of the particles themselves and without the need to break the carrier fluid into droplets.

According a first aspect of the present invention, there is provided a method of sorting particles in a stream of carrier fluid, the method comprising:
  introducing a stream of carrier fluid containing a mixture of particles into a stream of sheath fluid flowing within a flow channel so as to focus the carrier fluid into a core stream,
  detecting a particle of interest within the core stream of carrier fluid at a point of detection within the flow channel,
  applying a potential difference between a first electrode and one or more additional electrodes so as to generate a divergent electric field localised around a tip of the first electrode, wherein the tip of the first electrode is positioned inside of the flow channel or adjacent to the flow channel in a position in which the divergent electric field is experienced by the sheath fluid and carrier fluid within the flow channel, and
  subsequently terminating application of the potential difference,
    wherein the potential difference is applied in response to the detection of a particle of interest, the applied potential difference being sufficient to generate a centripetal force on a volume of carrier fluid within the divergent electric field, said volume of carrier fluid containing the particle of interest, so as to displace said volume of carrier fluid in a direction having a component orthogonal to the direction of flow, such that the particle of interest is diverted into a desired outlet of the flow channel.

In the context of the present specification, including the appended claims, a particle of interest refers to a particle which is desired to be separated from the mixture of particles as a whole. For example, it may be desired to separate a mixture of particles based on size, and in such cases it may be desired to separate out particles having a size greater than or equal to a predetermined particular threshold value. Accordingly, in this exemplary case, a particle of interest would be a particle having a size greater than or equal to said particular threshold value. It will be appreciated that particles of interest may be determined based on numerous other properties or characteristics such as shape or composition, which may be detected by use of an appropriate detection means.

Traditional dielectrophoretic sorting methods exploit dielectrophoretic forces acting directly on the particles within the stream of carrier fluid, which cause the particles to move through the carrier fluid towards a region of high or low electric field density. In contrast, the present invention exploits a liquid dielectrophoretic (LDEP) force acting on a volume of carrier fluid within the divergent electric field, to displace said volume of carrier fluid towards a region of high electric field density. Where said volume of carrier fluid contains a particle, the particle is displaced together with the displaced volume of carrier fluid in which the particle is contained, enabling the particle to be moved, together with the displaced volume of carrier fluid, into a different laminar flow path within the stream. The particle can thereby be diverted into a desired outlet of the flow channel. Accordingly, the present invention does not exploit the movement of a particle of interest through a carrier fluid, rather the invention utilises the movement of a portion or volume of the carrier fluid which contains a particle of interest to divert the particle into a desired channel.

With the method of the present invention, when the potential difference is applied between the electrodes, a liquid dielectrophoretic force is generated on molecules of the carrier fluid passing through the divergent electric field localised around the tip of the first electrode (that is, a volume of the carrier fluid within the divergent electric field). Molecules of the carrier fluid flowing past the first electrode experience a liquid dielectrophoretic force towards the first electrode (i.e. towards the region of stronger electric field). If the carrier fluid is treated as incompressible, molecules of carrier fluid cannot move towards the electrode due to push back from the other molecules of the carrier fluid. Thus, the acceleration of molecules in the fluid is limited to the centripetal acceleration that would cause circular motion around the electrode, given by the equation:

$$a_c = v^2/r$$

where $a_c$ is the centripetal acceleration, v is the velocity of the flowing liquid and r is the distance from the molecule to the electrode tip. If the flow velocity is zero, the acceleration would be zero; flow is required for the LDEP force to cause a displacement. Furthermore, an upper limit on the useful LDEP force is implied: the force required to move the fluid in a circular path around the electrode is given by the equation:

$$F_c = mv^2/r$$

where $F_c$ is the centripetal force, m is the mass of the liquid molecule, v is the velocity of the flowing liquid and r is the distance from the molecule to the electrode tip. Additional force will serve little purpose.

Where a sufficient potential difference is applied to the carrier fluid (that is, where the strength of the divergent electric field is sufficient), molecules of carrier fluid flowing past the first electrode experience a centripetal acceleration towards the first electrode, causing a substantially circular movement of the carrier fluid molecules around the tip of the first electrode. The volume of carrier fluid is therefore displaced in a direction having a component orthogonal to the direction of flow and is thus diverted into a different path in the laminar flow.

In the context of the present specification, reference to movement of particles and/or carrier fluid in a direction orthogonal to the direction of flow is to be interpreted as movement in a direction having a component orthogonal to the direction of flow. That is, orthogonal movement is not to be interpreted as being exclusively perpendicular to the direction of flow or in an exclusively linear direction.

If the diverted portion of carrier fluid carries one or more particles (e.g. biological cells, virus, extracellular vesicles), by turning the electric field on and off at the appropriate time, particles of interest in the narrow stream of carrier fluid which are detected by the detection means may be moved orthogonally to the direction of flow, from one laminar flow path into another, together with the portion of carrier fluid in which the particles of interest are carried.

This process may be performed at high speed and particles flowing along different laminar flow paths may then be collected separately in different outlet channels. Furthermore, the electric field can be switched on or off in negligible time and the conversion from electrical to kinetic energy is relatively efficient. The dielectric loss is small, thus minimal heat is generated and the chance of damage to the particles is low. Furthermore, the laminar flow path into which the particles are diverted may be a slower flowing path, allowing the concentration of particles within that flow path to be maximised.

In contrast to traditional DEP separation methods, in the method of the present invention the DEP force acts on the sheath fluid and/or carrier fluid, rather than on the particles themselves. Accordingly, the method is not reliant on the dielectric properties of the particles themselves, and thus the effectiveness of the method is not dependent on the sample type being sorted. Furthermore, since the particle of interest is moved together with the volume of carrier fluid in which it is contained, the particle does not have to move through the carrier fluid in order to be diverted from its flow path for sorting, and thus does not need to overcome viscous drag forces. This permits substantially faster orthogonal movement of particles within the flow channel and thus much greater sort rates can be achieved, compared to traditional DEP sorting methods.

It will be appreciated that the strength of the electric field (and thus the magnitude of the applied potential difference) required to generate a centripetal liquid dielectrophoretic force on the volume of carrier fluid sufficient to displace said volume in an orthogonal direction is dependent upon a large number of variables. For example, the required potential difference is dependent upon, in particular, the carrier fluid used, the flow rate of the carrier fluid, the diameter of the flow channel, the separation between the first electrode and the one or more additional electrodes, the shape of the tip of the electrode and the desired displacement of the carrier fluid.

In the context of the present invention, a sort zone is defined as a zone within the flow channel localised around the tip of the first electrode, in which zone the sheath fluid and carrier fluid are subject to the divergent electric field to an extent sufficient to divert a portion of the sheath fluid and/or carrier fluid within said zone into a different path in the laminar flow.

In some embodiments, the potential difference is applied at a first predefined time interval after detection of said particle of interest and the application of the potential difference is terminated at a second predefined time interval after said application of the potential difference. Application of a potential difference between electrodes, or termination thereof, at a predefined time interval refers to switching the electric field on or off after a predefined time period has passed. Accordingly, the electric field is switched on after the passage of a predefined time period following the detection of the particle of interest. Similarly, the electric field is switched off after the passage of a predefined time period following the switching on of the electric field.

The first and second predefined time intervals are variable in dependence upon the flow rate of the carrier fluid. Accordingly, the electric field can be switched on at an appropriate point in time at which the portion of fluid containing the detected particle of interest is in the sort zone, and is thus diverted when the electric field is switched on. Similarly, the electric field is switched off at an appropriate point in time after the portion of fluid containing the particle of interest has passed through the sort zone.

The first predefined time interval preferably corresponds to an amount of time taken for a particle within the stream of carrier fluid to travel from the point of detection to a predefined point in the flow channel, at which predefined point the sheath fluid and/or carrier fluid is subject to the divergent electric field localised around the first electrode. That is to say, said predefined point is a point located within the sort zone of the flow channel.

In alternative embodiments of the present invention, the presence of the particle of interest within the sort zone may be determined by other means which are not reliant upon predetermined time intervals. For example, one or more secondary detectors may be used to detect the particle of interest entering the sort zone, providing a trigger for activation of the electric field. A further detector may be used to detect the particle of interest exiting the sort zone, providing a trigger for deactivation of the electric field.

In some embodiments of the present invention, the applied potential difference (that is, the polarity and magnitude of the potential difference) and the decision to apply the potential difference is not reliant upon the dielectric properties of the detected particle. Accordingly, the method may be entirely independent of the dielectric properties of the particle of interest.

The method of the present invention is configured to displace particles together with the carrier fluid surrounding them; the potential difference is applied so as to accelerate the carrier fluid, taking the particles with it. Differences in the properties of the particles and carrier fluid may cause the particles to lag behind or move ahead of the carrier fluid, for example positive or negative DEP or density differences. It may be possible to compensate for these factors by adjusting the potential difference applied, for example a larger voltage to collect particles which 'lag' and smaller voltage for particles which 'move ahead'.

When the particles have different electrophoretic properties to the carrier fluid, a positive or negative DEP force will act on the particle, causing it to accelerate towards its 'terminal velocity' at which the viscous drag force is equal and opposite. For typical applications of the present invention, the terminal velocity due to DEP acceleration is far less than the velocity reached by the carrier fluid due to centripetal LDEP acceleration. In such cases, the DEP separation can be considered negligible.

If the density of the particles is greater than the carrier fluid, the orthogonal movement of the particles will lag behind that of the carrier fluid. If the density of the particles is less than the carrier fluid, the particles will be pushed ahead of the fluid (which may be referred to as 'buoyancy'). Accordingly, in some embodiments of the present invention, the applied potential difference may be varied in dependence on the density of the particle of interest. Similarly, the potential difference may be varied in dependence on any other characteristic of the particle of interest which may cause the particle of interest to move head of or lag behind the carrier fluid.

In preferred embodiments, the particle of interest is detected on the basis of its optical properties, and more preferably on the basis of its fluorescence and/or light scatter properties. The mixture of particles may be labelled with one or more fluorescent markers prior to being introduced into the flow channel.

The tip of the first electrode is preferably positioned within the flow channel so as to lie within the stream of sheath fluid surrounding the core stream of carrier fluid. That is, the distalmost point of the tip of the first electrode is positioned within the flow channel so as to lie within the stream of sheath fluid surrounding the core stream of carrier fluid.

The sheath fluid is preferably a dipolar liquid with high electrical susceptibility. In preferred embodiments, the sheath fluid is water and most preferably demineralised water.

The carrier fluid is preferably a dipolar liquid with high electrical susceptibility and is most preferably aqueous. Where the particles to be sorted are biological particles, the carrier fluid preferably comprises a cell medium, which in the context of the present invention refers to a medium capable of supporting a cell, vesicle or virus in a stable condition. In order to prevent lysis of cells and vesicles within the carrier fluid by osmosis, the osmolarity of the carrier fluid may be raised by addition of sugars such as sucrose, glucose or adonitol. Thus, in preferred embodiments, the carrier fluid is a cell medium comprising one or more sugars, which may preferably be one or more sugars selected from the group consisting of sucrose, glucose and adonitol.

The present invention requires a relatively short electric field pulse duration in order to displace the volume of carrier fluid. To minimise the required voltage the electric field pulse duration should be comparable to the time taken for a particle in the fluid to pass through the non-uniform electric field. If the pulse duration is much longer, excessive fluid will be sorted before and after arrival of the particle in the LDEP sort zone. If the pulse duration is much shorter, a higher LDEP voltage will be required, since a shorter pulse duration requires a greater LDEP force to achieve the same change in momentum. Accordingly, in the present invention the potential difference may preferably be applied for a period of time less than or equal to 1 millisecond (ms), and more preferably fora period of time within the range 50 microseconds ($\mu$s) and 1 ms. This is in contrast to traditional DEP sorting methods, which typically require electric field pulse durations much greater than 1 ms to permit sufficient movement of the particle through the carrier fluid, against the viscous drag forces.

The applied potential difference may be in the range 75 V to 1200 V, and may preferably be greater than 100 V.

The flow velocity of the carrier fluid may be approximately 1 m/s.

According to a second aspect of the present invention, there is provided an apparatus for executing the method of the first aspect of the present invention. The apparatus comprises:
- a flow channel having:
  - an inlet region in which a carrier fluid containing a mixture of particles is introduced into a stream of sheath fluid flowing within the flow channel;
  - a detection region downstream of the inlet region;
  - a sorting region downstream of the detection region; and
  - an outlet region downstream of the sorting region, the outlet region comprising at least two outlet channels, the apparatus further comprising
- a detection system provided within the detection region, said detection system being configured to detect a particle of interest to be separated from the mixture of particles according to one or more properties of the particle of interest,
- a first electrode comprising a tip positioned inside of the flow channel or adjacent to the flow channel in a position in which a divergent electric field generated by the first electrode is experienced by the sheath fluid and carrier fluid within the flow channel,
- one or more additional electrodes arranged such that a divergent electric field localised around the tip of the first electrode is generated when a potential difference is applied between the first electrode and the one or more additional electrodes, and
  - a control unit configured to apply a potential difference between the first electrode and one or more additional electrodes in response to a particle of interest being detected by the detection system, the applied potential difference being sufficient to generate a centripetal force on a volume of carrier fluid within the divergent electric field, said volume of carrier fluid containing the particle of interest, such that, in use, application of the potential difference causes said volume of carrier fluid to be displaced in a direction having a component orthogonal to the direction of flow, such that the particle of interest is diverted into a desired outlet of the flow channel.

The laminar-flowing stream of carrier fluid and sheath fluid must have a sufficient diameter or width to allow displacement of the particles between laminar flow paths within the stream, and thus it is desirable that, in the sorting region, the stream is substantially wider than the particles being sorted. According, the sorting region of the flow channel preferably has an internal diameter or width in the range 10 μm to 3 mm and more preferably has an internal diameter or width of at least 100 μm.

The detection system may comprise any detector capable of detecting a particle or particles of interest within the stream of carrier fluid. That is to say, the detection system may comprise any detector capable of determining a property of a particle within the stream of carrier fluid, by which property the particle can be identified as a particle of interest, and thus by which a decision to separate the particle from the mixture of particles can be made. For example, the detector may be configured to measure the particle size or morphology, or to indicate the presence of a particular functional group or substance present in the particle. The detector may preferably be arranged to detect a chemical marker, label or tag (such as a fluorescent marker), which is indicative of the presence and/or concentration of a particular substance or functional group within the particle, such as the DNA content of a cell. Preferably, the detection system comprises an optical detection system and more preferably a fluorescence detector.

The tip of the first electrode must be capable of generating a divergent, radial electric field that acts on a short portion of the stream of sheath fluid and carrier fluid. Accordingly, it is desirable that the tip is small in the flow direction. Furthermore, the smaller and sharper the tip of the electrode, the greater the gradient of the electric field generated, and thus the stronger the liquid dielectrophoretic force acting on the sheath fluid and carrier fluid. It is therefore preferable that the tip of the first electrode is sharp. Accordingly, in preferred embodiments, the tip has a diameter less than or equal to 1 mm, and more preferably less than or equal to 0.5 mm, at its distalmost point. Preferably, the tip is tapered to a point.

The electrodes may comprise a dielectric coating to minimise electrolysis of the sheath fluid and/or carrier fluid.

In a third aspect of the present invention, there is provided a method of sorting particles in a stream of carrier fluid, the method comprising:
- introducing a stream of carrier fluid containing a mixture of particles into a stream of sheath fluid flowing within a flow channel so as to focus the carrier fluid into a core stream,
- detecting a particle of interest within the core stream of carrier fluid at a point of detection within the flow channel,
- applying a potential difference between a first electrode and one or more additional electrodes so as to generate a divergent electric field localised around the first electrode, said potential difference being applied in response to the detection of a particle of interest, wherein the first electrode comprises a tip positioned inside of the flow channel or adjacent to the flow channel in a position in which the divergent electric field is experienced by the sheath fluid and carrier fluid within the flow channel, and wherein the potential difference is applied at a first time interval after detection of said particle of interest, and
- terminating application of the potential difference at a second time interval after said application of the potential difference.

In a fourth aspect of the present invention, there is provided an apparatus for executing the method of the third aspect of the present invention. The apparatus comprises:
- a flow channel having:
  - an inlet region in which a carrier fluid containing a mixture of particles is introduced into a stream of sheath fluid flowing within the flow channel;
  - a detection region downstream of the inlet region;
  - a sorting region downstream of the detection region; and
  - an outlet region downstream of the sorting region, the outlet region comprising at least two outlet channels, the apparatus further comprising
- a detection means provided within the detection region, said detection means being suitable for detecting particles of interest to be separated from the mixture of particles,
- a first electrode comprising a tip positioned inside of the flow channel or adjacent to the flow channel in a position in which a divergent electric field generated by the first electrode is experienced by the sheath fluid and carrier fluid within the flow channel, one or more additional electrodes arranged such that a divergent electric field localised around the first electrode is generated when a potential difference is applied between the first electrode and the one or more additional electrodes, and means for applying a potential difference between the first electrode and one or more additional electrodes in response to a particle of interest being detected by the detection means.

BRIEF DESCRIPTION OF THE DRAWINGS

Non-limiting embodiments of the invention will now be described, by way of example only, with reference to the accompanying drawings in which.

DETAILED DESCRIPTION

Figure 1:
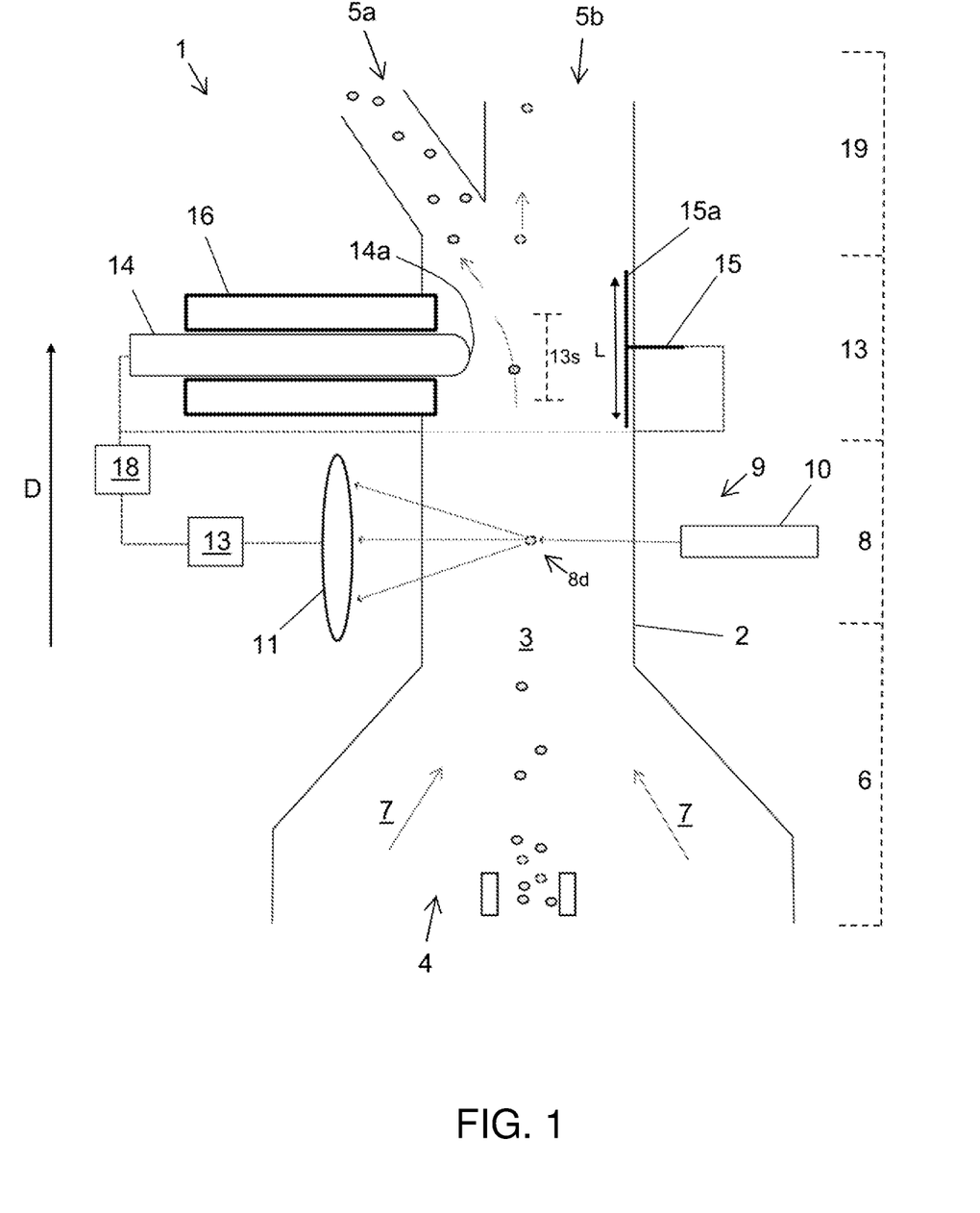
FIG. 1 is a schematic diagram of an apparatus for sorting particles according to the present invention.

With reference to FIG. 1, there is shown an apparatus 1 for sorting particles according to the present invention. The apparatus 1 comprises a flow channel 2 for conveying a stream of laminar flowing carrier fluid 3 between an inlet 4 of the flow channel 2 and one or more outlet channels 5a, 5b.

The flow channel 2 comprises an inlet region 6 in which a sample comprising mixture of particles in the carrier fluid 3 is introduced into the flow channel 2. The carrier fluid 3 is hydro-dynamically focused into a narrow sample core by a sheath fluid 7 as it flows into the flow channel 2. The relative flow rates of the carrier fluid 3 and the sheath fluid 7 are adjusted to provide a core stream of the carrier fluid 3, which core stream is sufficiently narrow such that particles within the carrier fluid 3 are aligned one-by-one within the same laminar flow path and travel at an identical velocity.

A detection region 8 is provided downstream of the inlet region 6. The focussed particle stream flows from the inlet region 6 into the detection region 8, where particles within the stream are analysed in sequence as they pass through the detection region 8. A detection system 9 is provided to analyse the particles and to identify particles of interest on the basis of one or more properties. For example, particles can be discriminated by their optical properties as they flow through a beam of illuminating radiation one particle at a time. The measured optical properties are indicative of a physical property or other characteristic of the particle by which the particles are to be discriminated, such as particle size or composition.

In the embodiment illustrated in FIG. 1, the apparatus comprises a radiation source 10, such as a laser source, which is arranged to irradiate the stream of carrier fluid at a predetermined point of detection 8d within the detection region 8 of the flow channel 2. The apparatus 1 further comprises a detector 11 having a lens arranged to collect light scattered and/or fluoresced by particles within the stream of carrier fluid 3.

In preferred embodiments of the present invention, the detection system 9 comprises at least one fluorescence detector, and thus discriminates particles by their fluorescence and/or light scatter properties. The apparatus is thus a variant of a FACS device. In such an arrangement, the sample is normally prepared by labelling it with one or more fluorescent markers. Each fluorescent marker emits light of a characteristic wavelength range (colour) when it is excited by the laser light. The fluorescent marker may be present in the particle in a quantity approximately proportional to a substance in the particle (for example the particle's DNA content), and therefore the fluorescence signals may indicate certain features of the particle.

It will be appreciated that any number of appropriate detectors may be included in the detection system 9 in order to discriminate particles on the basis of various physical properties, and in particular based on the optical properties of the particles. For example, independent optical detectors may be used to measure light scattered at a variety of angle ranges, typically described as Small Angle Light Scatter (roughly 1 to 15 degrees, "SALS"), Medium Angle Light Scatter (roughly 15 to 60 degrees, "MALS") and Large Angle Light Scatter (typically greater than 60 degrees, "LALS"), and optical detectors to measure several different colours of fluorescence. The scatter angles are chosen to optimise the resolution between different populations of particle.

Analysis of the particles one-by-one within the detection region 8 allows particles of interest within the sample to be identified, which particles of interest are to be separated from the particle mixture. The apparatus therefore further comprises a processing unit 12 arranged to process data received from the detector 10 in order to identify particles of interest within the sample.

After flowing through the detection region 8, the stream of carrier fluid 3 passes into a sorting region 13 downstream of the detection region 8, in which the particle mixture is sorted by separating identified particles of interest from the particle mixture.

The sorting region 13 comprises a first electrode 14 comprising a tip 14a arranged to protrude into the stream of sheath fluid and/or carrier fluid 3. A layer of insulation 16 is provided around the outer circumference of the first electrode 14. An additional electrode 15 is provided within the sorting region 13, which in the illustrated embodiment comprises a plate electrode 15a located on the opposite side of the flow channel 2 to the first electrode 14. However, in some embodiments the additional electrode 15 may be another type of electrode and/or further additional electrodes may be provided. Similarly, the tip 14a of the first electrode 14 may have any appropriate shape, provided it is capable of generating a divergent, radial electric field that acts on a short portion of the stream of sheath fluid and carrier fluid. To maximise the gradient of the electric field generated, the tip 14a preferably tapers to a point. Application of a potential difference between the first electrode 14 and the additional electrode 15 creates an electric field diverging from the tip 14a of the first electrode 14. Thus, when a potential difference is applied, the portion of carrier fluid 3 in a region localised around the tip 14a of the first electrode 14 is subject to the divergent electric field. The voltage may be 100 V or more in preferred embodiments.

Whilst the described embodiment comprises an arrangement of two electrodes, it will be appreciated that a number of arrangements of electrodes may be used to generate an electric field diverging from the tip of the first electrode. In particular, some embodiments of the present invention may utilise a first electrode comprising a tip, as substantively described above, and more than one additional electrode.

The one or more additional electrodes may have any desired configuration which provides for the generation of a divergent electric field localised around the tip of the first electrode when a potential difference is applied between the first electrode and the one or more additional electrodes. In particular, the configuration of the one or more additional electrodes is not restricted to that of the additional electrode 15 of the illustrated embodiment.

Polarizable liquids, when subjected to a divergent electric field, are actuated and experience a force towards regions of high electric field intensity. Molecules of the polarizable liquid become aligned with the non-uniform electric field as they come under its influence and experience a dielectrophoretic force along the direction of the electric field, which force is attractive towards the region of stronger electric field.

Figure 2:
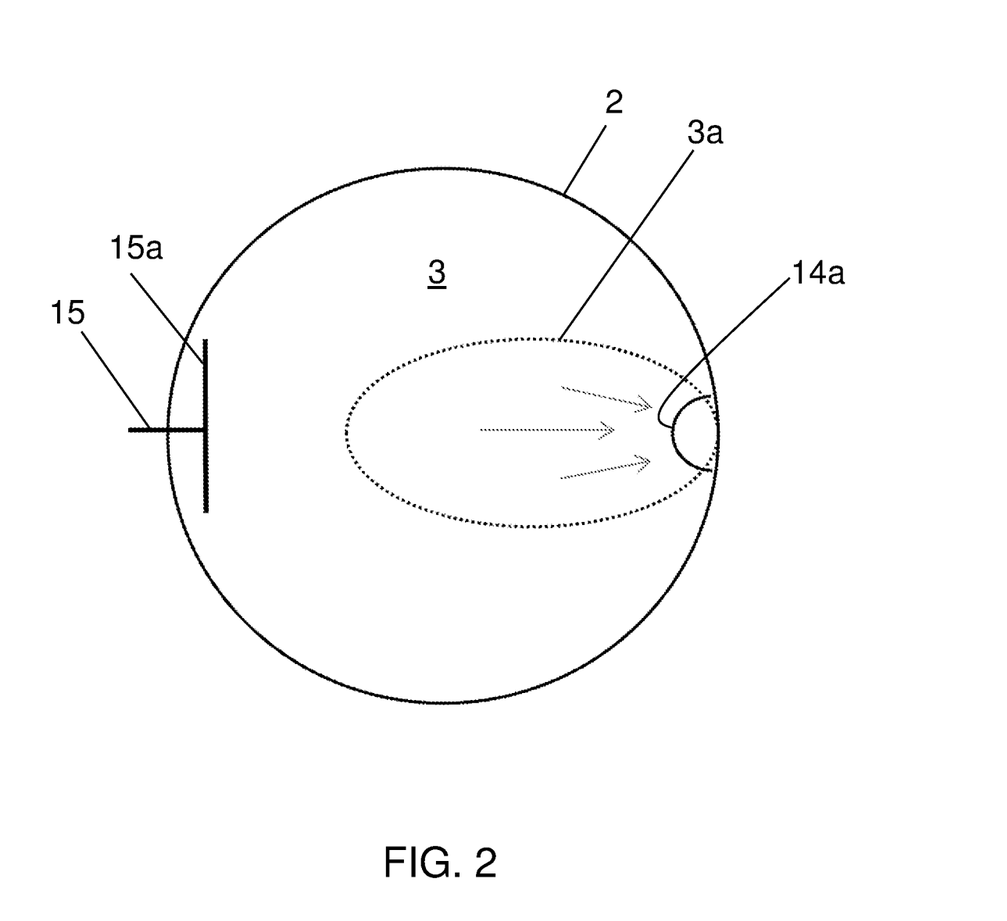
FIG. 2 is a cross-section of the apparatus of FIG. 1.

FIG. 2 shows the flow channel 2 in cross section, wherein the flow direction is perpendicular to the plane of the page, and depicts a portion of carrier fluid 3a passing between the first electrode 14 and the additional electrodes 15, which is subject to a radial dielectrophoretic force as a result of the non-uniform electric field.

As the carrier fluid 3 flows through the non-uniform field generated between the first electrode 14 and the additional electrode 15, molecules of the carrier fluid 3 turn to stay aligned with the changing electric field about the tip 14a of the first electrode 14. The dielectrophoretic force experienced by the molecules of the carrier fluid 3 and/or sheath fluid 7 is a function of the gradient of the electric field strength, and thus is stronger closer to the tip of the first electrode 14 in a radial field. The centripetal dielectrophoretic force acting on the carrier fluid 3 and/or sheath fluid 7 results in a substantially circular movement of the carrier fluid 3 and/or sheath fluid in a direction having a component orthogonal to the laminar flow direction D, displacing a portion of the carrier fluid 3 between laminar flow paths and thus diverting the portion of carrier fluid 3. Accordingly, as illustrated in FIG. 1, any particles carried with the diverted portion of the carrier fluid are also diverted to a different laminar flow path, which may be flowing at a lower velocity to maximise the resultant particle concentration.

Referring again to FIG. 1, in order to separate particles of interest out from the mixture of particles being carried by the carrier fluid, the apparatus further comprises a control unit 18 in communication with the processing unit 12, the control unit 18 being arranged to intermittently apply a potential difference between the electrodes 14, 15 in response to the detection of a particle of interest. When a particle of interest is identified by the detection means 9, the processing unit 12 delivers a signal to the control unit 18 to apply a potential difference between the electrodes 14, 15 at a first predefined time interval after the detection of the particle of interest. The first predefined time interval corresponds to the amount of time taken for the particle of interest to pass from the point of detection 8d to a sort zone 13s of the sorting region 13, and is therefore dependent upon the flow rate of the carrier fluid 3. The sort zone 13s of the sorting region is a zone in which carrier fluid 3 is subject to the diverging electric field to an extent sufficient to divert a portion of the carrier fluid 3 as described above. Accordingly, when the detected particle of interest enters the sort zone 13s, application of a potential difference between the electrodes 14, 15 generates an electric field between the electrodes 14, 15, which electric field diverges from the tip 14a of the first electrode 14, and thus the portion of carrier fluid 3 carrying the detected particle of interest is diverted into a different laminar flow path.

Application of a potential difference between the electrodes 14, 15 is subsequently terminated at a second predefined time interval after the initial application of the voltage. The second predefined time interval corresponds to an amount of time taken for a particle to flow through the effective sort zone 18s. Accordingly, the voltage is terminated once the particle of interest has passed through the sort zone 13s. Any particles subsequently passing through the sort zone 13s will remain within the original flow path, unless a potential difference is again applied between the electrodes 14, 15.

The flow channel 2 further comprises an outlet region 19 comprising a plurality of outlet channels. In the embodiment of FIG. 1, the outlet comprises two outlet channels 5a, 5b. As shown, particles diverted away from the original flow path enter a first outlet channel 5a, whilst particles not diverted continue along the original flow path and enter a second outlet channel 5b. Particles can thereby be sorted by selective application of potential difference between the electrodes 14, 15.

In some embodiments, the potential difference may be applied between the first electrode and other electrodes upstream and/or downstream of the sort zone 13s, in order to generate the desired divergent electric field localised around the tip 14a of the first electrode 14.

If the flow rate of the carrier fluid is of the order of a few metres per second, kilohertz sorting rates may be achieved. For example, if the tip 14a of the first electrode has a diameter of 0.5 mm, the effective sort zone 13s may be limited to a length of approximately 1 mm along the stream. If the fluid velocity is 5 metres per second, particles will take approximately 200 μs to travel through the effective sort zone 13s. However, where particles are randomly dispersed in the carrier fluid, sufficient distance between particles is desirable to minimise the probability of coincident particles in the sort zone 13s and thus maximise the purity of the sorted sample. The average distance between particles within the stream of carrier fluid is a function of the flow rate of the carrier fluid and the injection rate of the particles. Thus, the process may be optimised to achieve the desired selectivity at the highest possible flow rate according to the sample type and concentration, for example.

Additional electrodes may be added to enable sorting into multiple laminar flow paths. In a system with multiple electrodes, steering of the flow can be achieved by activating one pair of electrodes or by the exploitation of dielectrophoretic forces from multiple electrodes. For example, the sorting region 13 of FIG. 1 may be a first sorting region, and a second sorting region may be provided downstream of the first sorting region via the second outlet channel. The second sorting region comprises a second electrode having a tip as described above in relation to the first electrode in order to provide the desired dielectrophoretic force. Selective application of a potential difference between the second electrode and one or more additional electrodes may thereby be utilised to sort particles which were not separated out in the first sorting process i.e. particles that remain in the original laminar flow path after passing through the first sorting region. The second sorting decision may be based on a different property measured by the same or another detection system. Alternatively, or additionally, multi-way sorting can be achieved within the same sorting region by adding additional electrodes and additional outlet channels, such that a non-uniform electric field can be generated in any one of a plurality of directions, thus allowing particles to be sorted into one of a plurality of outlet channels by diverting appropriate portions of the carrier fluid into different laminar flow paths.

Figure 3:
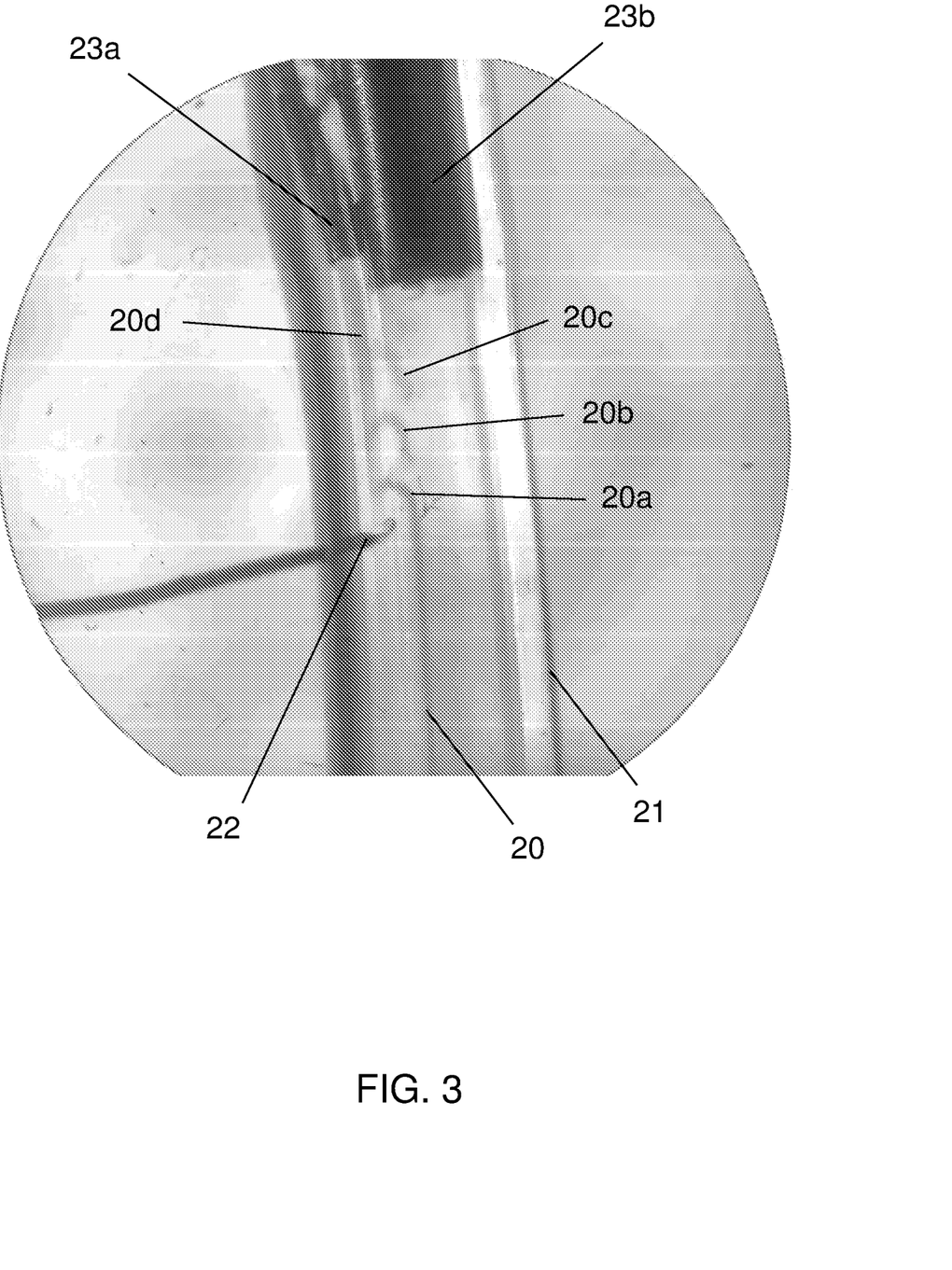
FIG. 3 is an image of a laminar flowing stream of ink particles observed under stroboscopic illumination.

FIG. 3 provides an example of a method by which the generation of a centripetal force on a volume of carrier fluid flowing in a flow channel can be verified. FIG. 3 shows a laminar flowing stream of ink particles 20 within a stream of deionised water, observed under stroboscopic illumination. FIG. 3 shows an apparatus comprising a flow channel 21 of 1.6 mm diameter plastic tubing. A first electrode 22 is positioned with its tip in the stream of deionised water, the electrode being configured to generate a divergent electric field in combination with an additional electrode (not shown) upon application of a potential difference between the electrodes. Two outlet channels 23a, 23b are provided downstream of the first electrode 22.

To record the image shown in FIG. 3, deionised water (carrier fluid) was passed through the flow channel 21 in flow direction D (the upwards direction of FIG. 3). Ink particles 22 were injected and focussed into a narrow stream 20. A potential difference of 300 V was applied between the first electrode 22 and the additional electrode (not shown), at a pulse duration of 300 µs and a frequency of 100 Hz. The apparatus was illuminated momentarily each time the potential difference was applied to record the image.

As can be seen from FIG. 3, the stream of ink particles 20 upstream of the first electrode 22 travels along a substantially linear flow path. Downstream of the first electrode 22, three disturbances 20a, 20b, 20c can be seen in the stream of ink particles 20, corresponding to three pulses of the electric field generated by application of the potential difference to the electrodes. Application of the potential difference generates a centripetal liquid dielectrophoretic force on the deionised water carrier fluid, causing a substantially circular movement of the deionised water carrier fluid towards the leftmost (as shown) wall of the flow channel. This is observed by the corresponding displacement of the stream of ink particles 20.

As the ink particles 20 are displaced orthogonally to the direction of flow D, the particles are displaced into a slower moving laminar flow path near the wall of the flow channel 21, resulting in a concentrated stream of ink particles 20d. The ink particles within the concentrated stream 20d are thereby diverted into outlet channel 23a.

To verify the application of the centripetal liquid dielectrophoretic technique of the present invention in a particle sorting method, an apparatus 1 was constructed as shown in FIG. 1, comprising a flow channel 3 having an internal diameter of 1 mm. A test sample was prepared containing a 50:50 mixture of two types of 500 nm polystyrene microspheres, denoted Type-A and Type-B polystyrene microspheres. Type-A and Type-B microspheres were distinguishable by their fluorescence properties. The polystyrene microsphere mixture was introduced into a stream of deionised water in the flow channel 3 at a rate of approximately 1000 microspheres per second by a stepper motor driven syringe. The control unit 18 was configured to apply a potential difference of 700 V between the first electrode 14 and the additional electrode 15 for a duration of 500 µs in response to the detection of Type-A polystyrene microspheres only, as determined by the detection system 9 comprising a fluorescence detector 11 capable of distinguishing the two types of polystyrene microspheres.

Two outlet channels 5a, 5b were provided downstream of the first electrode 14. A first outlet channel 5a was positioned to receive a portion of the stream of carrier fluid near the wall of the flow channel 3 corresponding to the side of the flow channel 3 at which the tip 14a of the first electrode 14 was positioned (the lefthand side of the flow channel 3, as shown in FIG. 1). A second outlet channel 5b was positioned to receive the remainder of the stream of carrier fluid. Accordingly, after passing through the sort zone, particles displaced orthogonally in the direction of the tip 14a of the first electrode 14 were collected within the first outlet channel 5a. Particles remaining within the central flow path (the original flow path of the stream of particles prior to entering the sort zone 13s) were collected within the second outlet channel 5b.

To verify the method, the sample collected within the first outlet channel 5a (the "sorted sample") was subsequently reanalysed using a flow cytometer. Of the microspheres present within the sorted sample, more than 90% were found to be Type-A polystyrene microspheres. Accordingly, it was found that upon detection of Type-A polystyrene microspheres, generation of a divergent electric field resulted in displacement of the Type-A polystyrene microspheres towards the region of high electric field density located around the tip 14a of the first electrode 14, resulting in the collection of majority Type-A polystyrene microspheres within the first outlet channel 5a. Using the above method, a sort rate of approximately 500 Hz was achieved.

It will be apparent to a person skilled in the art that polystyrene microspheres, having a dielectric constant significantly smaller than that of water, would not move through the water towards a region of high electric field density when subjected to a divergent electric field. Accordingly, it can be seen that orthogonal displacement of the polystyrene microspheres using the method of the present invention is not a result of dielectrophoretic forces acting directly on the polystyrene microspheres causing the movement of microspheres through the carrier fluid. Rather, the observance of a displacement of polystyrene microspheres into the first outlet channel 5a in the test method described above verifies that application of the potential difference between the electrodes generates a centripetal liquid dielectrophoretic force acting on the carrier fluid (deionised water in the described embodiment), resulting in a displacement of a volume of the carrier fluid towards the region of high electric field density. Particles contained within said volume of carrier fluid are displaced together with the displaced volume of carrier fluid, regardless of the dielectric properties of the particles themselves. Thus, it will be apparent to a person skilled in the that the generation of a centripetal liquid dielectrophoretic force on a volume of carrier fluid within the divergent electric field can be positively verified in the above-described manner.

It will be further appreciated that the strength of the electric field (and thus the magnitude of the applied potential difference) required to generate a centripetal liquid dielectrophoretic force on the volume of carrier fluid sufficient to displace said volume in an orthogonal direction is dependent upon a large number of variables. The present invention is therefore not limited to the conditions described in the above test method. For example, the required potential difference is dependent upon, in particular, the carrier fluid used, the flow rate of the carrier fluid, the diameter of the flow channel, the separation between the first electrode and the one or more additional electrodes, the shape of the tip of the electrode and the desired displacement of the carrier fluid. Accordingly, it will be apparent to a person skilled in the art that the conditions of the method described above can be modified and optimised to achieve centripetal LDEP particle sorting within a variety of systems and applications and for a variety of particle types, without deviating from the scope of the present invention.

To achieve sort rates of the order of 1 kHz with a particle displacement of approximately 100 µm, centripetal accelerations of molecules in the fluid greater than 0.1 mm/ms$^2$ (100 m/s$^2$) are required. In the apparatus described above, a liquid dielectrophoretic force generated by an electric field gradient created by a potential difference of few hundred Volts, applied for a fraction of a millisecond was found to be sufficient to displace tens of nanolitres of fluid by 100 μm in a direction orthogonal to flow at a velocity of approximately 1 m/s. This is in contrast to traditional DEP sorting methods, in which the velocity at which particles move through the carrier fluid is approximately 1000 times slower than with the present invention. Accordingly, the present invention permits significantly shorter electric field pulse durations and thus significantly greater particle sort rates.

The invention has been described above with reference to specific embodiments, given by way of example only. It will be appreciated that different arrangements of the system are possible, which fall within the scope of the appended claims.

The invention claimed is:

1. A method of sorting particles in a stream of carrier fluid, the method comprising:
   introducing a stream of carrier fluid containing a mixture of particles into a stream of sheath fluid flowing within a flow channel so as to focus the carrier fluid into a core stream,
   detecting a particle of interest within the core stream of carrier fluid at a point of detection within the flow channel,
   applying a potential difference between a first electrode and one or more additional electrodes so as to generate a divergent electric field localised around a tip of the first electrode, wherein the tip of the first electrode is positioned inside of the flow channel or adjacent to the flow channel in a position in which the divergent electric field is experienced by the sheath fluid and carrier fluid within the flow channel, and
   subsequently terminating application of the potential difference,
   wherein the potential difference is applied in response to the detection of a particle of interest, the applied potential difference being sufficient to generate a centripetal force on a volume of carrier fluid within the divergent electric field, said volume of carrier fluid containing the particle of interest, so as to displace said volume of carrier fluid in a direction having a component orthogonal to the direction of flow, such that the particle of interest is diverted into a desired outlet of the flow channel.

2. The method of sorting particles according to claim 1, wherein the potential difference is applied at a first predefined time interval after detection of said particle of interest and the application of the potential difference is terminated at a second predefined time interval after said application of the potential difference.

3. The method of sorting particles according to claim 2, wherein the first predefined time interval corresponds to an amount of time taken for a particle within the stream of carrier fluid to travel from the point of detection to a predefined point in the flow channel, at which predefined point the sheath fluid and/or carrier is subject to the divergent electric field localised around the first electrode.

4. The method of sorting particles according to claim 1, wherein the potential difference and the application thereof is not reliant upon the dielectric properties of the detected particle of interest.

5. The method of sorting particles according to claim 1, wherein the particle of interest is detected on the basis of its optical properties.

6. The method of sorting particles according to claim 5, wherein the particle of interest is detected on the basis of its fluorescence and/or light scatter properties.

7. The method of sorting particles according to claim 6, wherein the mixture of particles is labelled with one or more fluorescent markers prior to being introduced into the flow channel.

8. The method of sorting particles according to claim 1, wherein the tip of the first electrode is positioned within the flow channel so as to lie within the stream of sheath fluid surrounding the core stream of carrier fluid.

9. The method of sorting particles according to claim 1, wherein the sheath fluid is a polar liquid.

10. The method of sorting particles according to claim 9, wherein the sheath fluid is water.

11. The method of sorting particles according to claim 1, wherein the carrier fluid is a polar liquid.

12. The method of sorting particles according to claim 11, wherein the carrier fluid comprises a cell medium.

13. The method of sorting particles according to claim 1, wherein the potential difference is applied for a period of time less than or equal to 1 ms.

14. The method of sorting particles according to claim 13, wherein the potential difference is applied for a period of time within the range 50 μs to 1 ms.

15. The method of sorting particles according to claim 1, wherein the applied potential difference is 100 V or more.

16. The method of sorting particles according to claim 1, wherein the carrier fluid has a flow velocity of approximately 1 m/s.

* * * * *